Nov. 27, 1956     A. Y. DODGE     2,772,085
SHOCK ABSORBER
Filed Sept. 7, 1954                                2 Sheets-Sheet 1
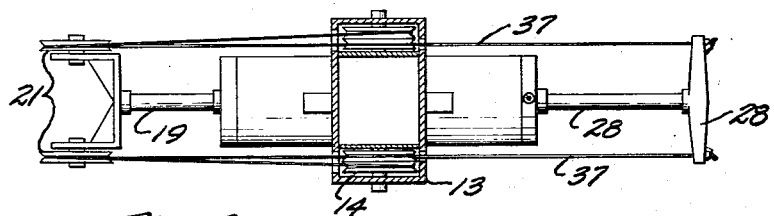
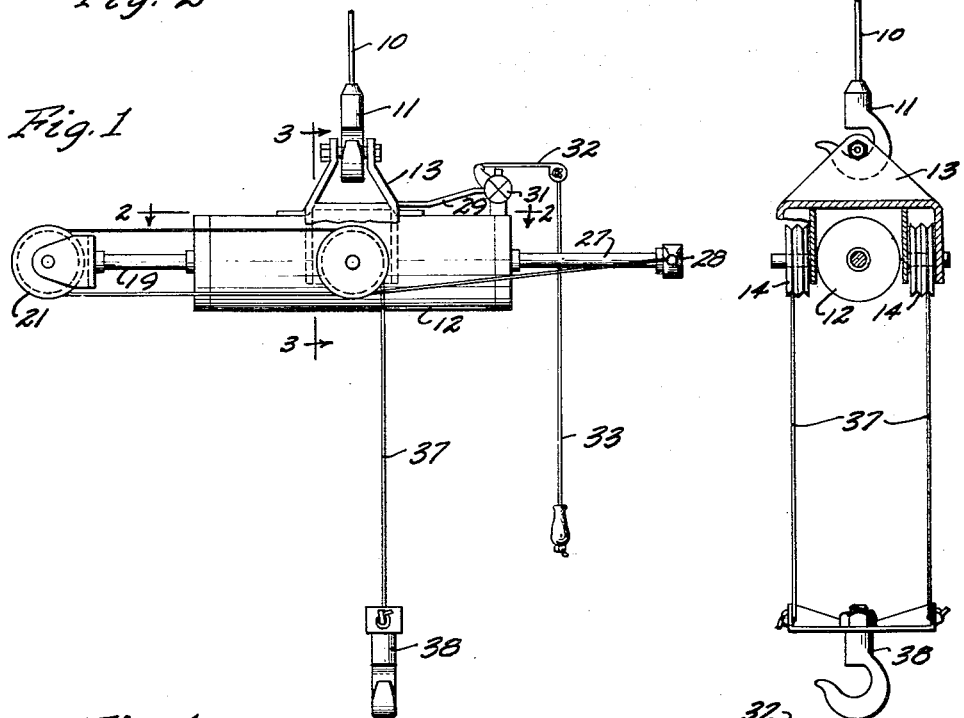
INVENTOR.
BY Adiel Y. Dodge
Bair, Freeman & Molinare
Attorneys

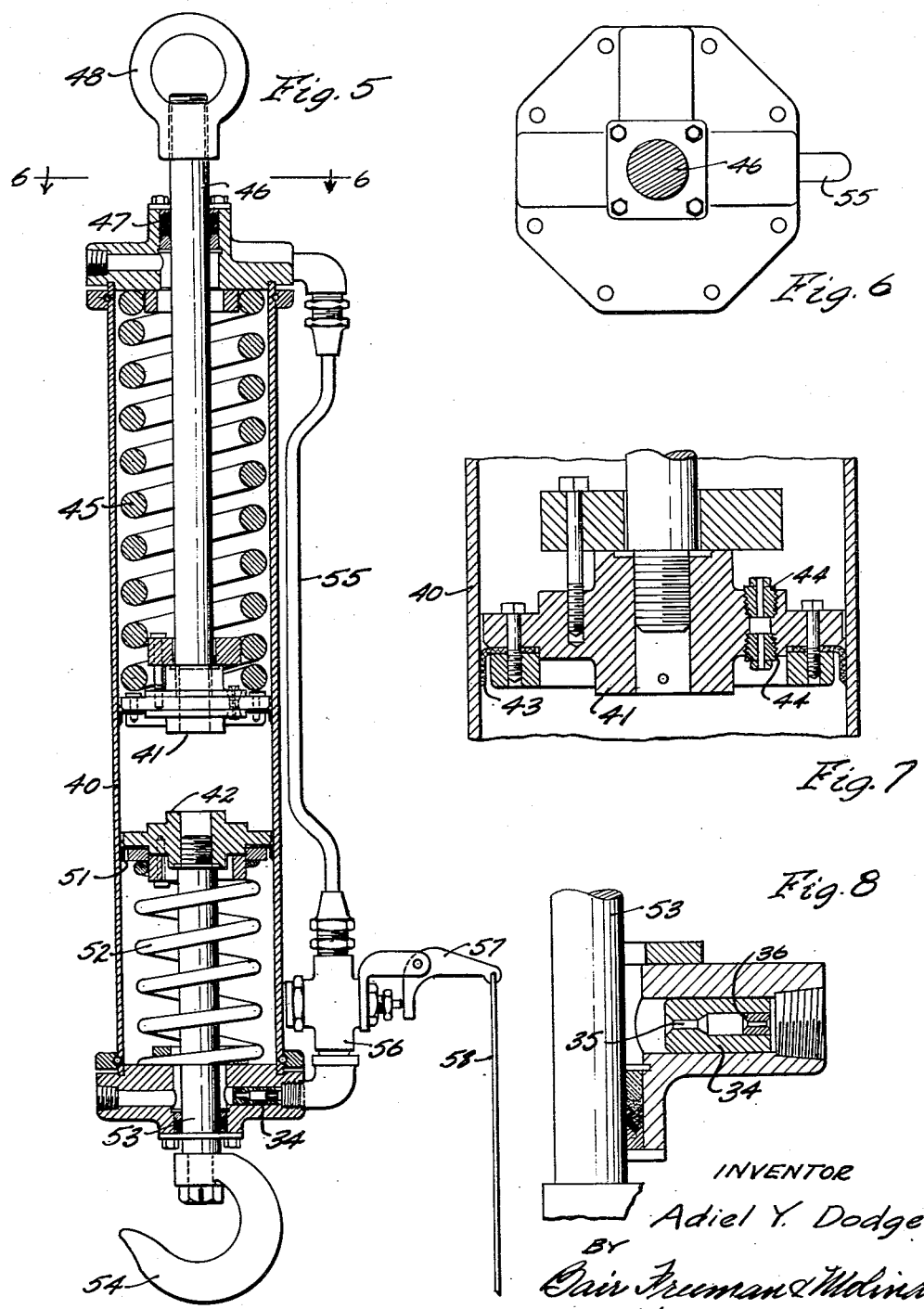

United States Patent Office 2,772,085
Patented Nov. 27, 1956

2,772,085

SHOCK ABSORBER

Adiel Y. Dodge, Rockford, Ill.

Application September 7, 1954, Serial No. 454,301

3 Claims. (Cl. 267—1)

This invention relates to shock absorbers and more particularly to shock absorbers to be used in picking up and setting down loads by mechanical handling devices, such as cranes.

In lifting, moving and placing objects by cranes, and the like, it is frequently necessary to handle the objects very carefully to prevent damage thereto. For example, in handling foundry flasks, the slightest jar may ruin a sand mold and it is necessary to have operators of sufficient skill to handle the flasks directly without damaging them. The present invention has for its principal object the provision of a shock absorbing mechanism which will enable objects to be picked up and set down very gently and without damage by power devices, such as cranes.

Another object is to provide a shock absorber in which rebounds or oscillations due to the velocity of the load reaching the velocity of the lifting device are eliminated.

Still another object is to provide a shock absorber in which the load can be picked up gently by gradual compression of a spring and oscillation or bouncing of the spring is hydraulically damped.

A further object is to provide a shock absorber in which the load can be set down slowly and gently under the control of hydraulic releasing means.

According to one feature of the invention, the hydraulic means for releasing the load is controlled by a simple manually operated shut-off valve and the rate of release is automatically controlled by an orifice so that no skill on the part of the operator is required.

A still further object is to provide a shock absorber which can be mounted and used in a minimum of vertical space.

According to one feature, the shock absorber is formed by an elongated cylinder arranged horizontally with a tension element passing over guided pulleys thereon to the load so that the vertical space requirements are reduced to a minimum.

The above and other objects and features of the invention will be more readily apparent from the following description when read in connection with the accompanying drawings, in which:

Figure 1 is a side elevation of a shock absorber mechanism embodying the invention;

Figure 2 is a top plan view with parts in section on the line 2—2 of Figure 1;

Figure 3 is a transverse section on the line 3—3 of Figure 1 with parts in elevation;

Figure 4 is an axial section through the shock absorber of Figures 1 to 3 with parts in elevation;

Figure 5 is a view similar to Figure 4 of an alternative shock absorber construction;

Figure 6 is a horizontal section on the line 6—6 of Figure 5;

Figure 7 is an enlarged partial section through the upper piston of Figure 5; and Figure 8 is an enlarged partial section through the orifice at the lower end of Figure 5.

The shock absorber of the present invention is adapted to be used on a crane or the like whose lifting cable is indicated generally at 10 connected to a hook 11 to receive a load. The shock absorbing device is adapted to be mounted between the hook 11 and the load to lift the load gently and to release it gently so that the load will not be damaged even in the case of delicate cases, such as sand flasks, or the like.

As shown in Figures 1 to 4, the shock absorber comprises a horizontally elongated cylinder 12 connected in its central part to a saddle structure 13 by which it may be supported from the hook 11. The saddle structure spans the cylinder, as best seen in Figures 2 and 3, and projects beyond the sides of the cylinder to provide space for mounting pairs of pulleys 14 at each side of the cylinder.

As best seen in Figure 4, the cylinder is divided intermediate its ends by a separator 15 separating the cylinder into two aligned cylindrical chambers. The chamber at the left end receives a piston 16 provided with a cup washer 17 which will seal against the cylinder wall when the piston is moved to the left, but which will freely bypass fluid from the right to the left side thereof so that the piston may be moved to the right with a minimum of resistance. The piston 16 is urged to the left by a compression spring 18 acting between the piston and the separator 15. The piston carries a piston rod 19 extending through the left end of the cylinder and carrying at its outer end a pair of pulleys 21, as best seen in Figures 1 and 2.

In order to permit movement of the piston 16 to the left when the seal 17 is effective, a restricting orifice 22 is provided through the piston from one face to the other thereof. The orifice 22 is preferably of a type to provide a resistance to flow therethrough which will increase with velocity to counteract pressure variations. This orifice may be, and preferably is, in the form of a double labyrinth orifice, as described hereinafter in connection with Figure 7. When the piston is moved to the left, its rate of movement will be controlled and damped by flow of liquid through the orifice 22 from one side of the piston to the other so that bouncing or oscillation of the piston will be prevented.

The right-hand chamber of the cylinder 12 slidably receives a piston 23 which is sealed in the cylinder against passage of fluid therepast in either direction. The piston 23 is formed with fluid passages 24 therethrough which are closed by a leaf spring type check valve 25 against passage of fluid from left to right through the piston. The valve 25 will open freely, however, to permit free passage of fluid from right to left through the piston so that the piston can be moved to the right in the cylinder without substantial restriction but cannot be moved to the left without restriction. A spring 26 in the cylinder urges the piston to the right and the piston carries a rod 27 projecting through the right end of the cylinder and carrying a cross member 28 at its outer end.

In order to permit movement of the piston 23 to the left, by a bypass connection 29 is provided from the right end of the cylinder to the separator 15 through which liquid can be bypassed around the piston. A manually operable shut-off valve 31 is provided in the bypass 29 and is formed with an operating handle 32. As shown in Figure 1, a cord 33 may be connected to the operating handle and may extend to a convenient elevation to be grasped by an operator so that when the cord is pulled, the shut-off valve 31 will be opened.

The bypass 29 is connected to the cylinder either at the right end thereof or at the separator 15 through a restricted orifice of the type shown in detail in Figure 8. As shown in this figure, the orifice is provided by a plug 34 fitting into a bore in the cylinder end and having a restricted passage 35 in one end thereof. The opposite end of the plug 34 receives a smaller plug 36 having a restricted passage therethrough of a size no larger than that of the passage 35 and preferably slightly smaller, as shown.

The orifice structure is preferably similar to the orifice 22. With this construction, the rate of movement of the piston 23 to the left in the cylinder is automatically controlled by the orifice so that the shut-off valve can be either fully open or fully closed and requires no skillful manipulation.

To receive the load a pair of tension elements 37 are connected at their ends to the cross member 28 and are extended over the pulleys 14, the pulleys 21 and back to the pulleys 14 to terminate in a load supporting hook, or the like 38. The cords may be made of such a length that in the no-load position, the hook 38 will lie close to the cylinder 12 so that a minimum of vertical space is occupied by the shock absorber and it can be used where space is at a premium.

In use of the mechanism, when no load is applied, both of the pistons 16 and 23 will be moved toward the outer ends of the cylinder by the springs 18 and 26 and the hook 38 will be in its uppermost position. When a load is applied, the cords 37 will be tensioned to urge the pistons inward of the cylinder. The piston 23 cannot move inward since the valve 25 will close and the valve 31 is closed. However, the piston 16 can move inward freely against the spring 18 so that the spring 18 will be compressed to apply a gradual lifting force to the load to pick it up gradually.

As the velocity of the load reaches the velocity of the lifting mechanism 11, the piston 16 will tend to bounce or oscillate against the spring 18. However, as soon as the piston 11 tends to move back to the left, the cup washer 17 will seal against the cylinder and liquid in the cylinder will be compelled to flow through the orifice 22. In this way, any tendency of bouncing or oscillation of the piston 16 is prevented so that the load will be picked up gradually and smoothly without any possibility of damage.

When it is desired to release the load, the lifting mechanism may be moved to position the load directly above the desired position and preferably a matter of a few inches therefrom. The operator may then pull on the cord 33 to open the valve 31 so that liquid can bypass the piston 23 and can flow through the bypass 29 from one side of the piston to the other. With the valve 31 fully opened, the rate of movement of the piston 23 will be accurately and uniformly regulated by the orifice construction 34 so that the load will be deposited very gently without requiring any skill whatever on the part of the operator.

The construction shown in Figures 5 to 8 is adapted for direct connection in the crane pick-up line to resist the load forces in tension. This construction, as shown, comprises an elongated vertical cylinder 40 closed at its ends and receiving an upper piston 41 and a lower piston 42. The upper piston 41 is sealed in the cylinder by a cup washer 43 facing downward, as seen in Figure 7, so that liquid can flow freely from top to bottom thereof, but will be sealed against upward flow therepast. A restricted orifice is provided through the piston by a pair of spaced plugs 44 screw threaded into aligned bores in the piston and provided with relatively small orifices to create at least two high fluid velocities whose energies are dissipated in turbulent space.

The piston 41 is urged downward by a compression spring 45 acting between the piston and the upper end of the cylinder and carries a piston rod 46 extending through a packing 47 in the upper end of the cylinder and terminating in a ring 48 to be received in the usual crane hook, such as the hook 11 of Figure 1.

The lower piston 42 is sealed in the cylinder by a cup washer 51 which will seal the piston in the cylinder against the flow of liquid upwardly therepast. The seal 51 will permit liquid to flow downwardly past the piston 42, but will seal against the cylinder to prevent upward flow therepast. The piston 42 is urged upward in the cylinder by a compression spring 52 and is provided with a piston rod 53 projecting through the lower end of the cylinder and carrying a hook 54 for connection to the load.

To enable downward movement of the piston 42 in the cylinder, a bypass connection 55 is provided from the lower to the upper end of the cylinder. A shut-off valve 56 is provided in the bypass connection which is normally closed and which can be opened by an oscillating lever 57 to which a cord 58 is connected.

The rate of downward movement of the piston 42 is controlled by the orifice structure 34, 35, 36, as shown in detail in Figure 8.

In operation of this mechanism, the ring 48 may be placed over the usual crane hook, such as 11, and the hook 54 may be connected to a load. When no load is applied the pistons will be urged inwardly toward the center of the cylinder, as shown in Figure 5. When a load is applied, the lower piston 42 will be held against downward movement since the seal 51 is effective and the valve 56 is closed. However, the piston 41 may be moved upward freely since liquid can bypass the seal 43. The spring 45 will therefore be compressed to pick up the load gradually, as in the construction of Figures 1 to 4. Any tendency toward bouncing or oscillation is damped by sealing of the seal 43 against the cylinder when the piston 41 tends to move downward thereby causing flow of liquid through the orifices 44.

When the load is to be released, it may be positioned a short distance above the desired point of release and the valve 56 may be opened. At this time, liquid can flow from the lower end of the cylinder through the bypass 55 to the upper end of the cylinder and can flow past the seal 43 to the space above the piston 42. The piston 42 can therefore move downward at a relatively slow rate determined by the orifice structure 34 to deposit the load gently without shock.

While two embodiments of the invention have been shown and described herein, it will be understood that they are illustrative only and not to be taken as a definition of the scope of the invention, reference being had for this purpose to the appended claims.

What is claimed is:

1. A shock absorber for cranes and the like comprising a cylinder, a piston in the cylinder having a piston rod extending through one end of the cylinder, means to seal the piston in the cylinder against flow of fluid therepast in one direction but to allow flow of fluid past the piston in the other direction, a spring urging the piston in one direction in the cylinder, a second piston in the cylinder having a piston rod extending through the other end of the cylinder, means to seal the second piston in the cylinder against flow of fluid therepast in one direction but to allow flow of fluid therepast in the opposite direction, means providing a restricted orifice through the second piston, a bypass connection around the first named piston, a restricted orifice in said bypass connection, a shut-off valve in the bypass connection, and means to connect the piston rods to a load, the second piston being held against movement in the cylinder by fluid trapped therein when the shut-off valve is closed and gradually yielding by flow of fluid through the orifice when the shut-off valve is open, the sealing means on the first piston allowing flow therepast when the piston moves in response to the load and the sealing means for the second piston sealing to prevent movement of the second piston in response to the load.

2. A shock absorber for cranes and the like comprising an elongated cylinder, means to connect the cylinder to a crane or the like with the cylinder axis horizontal, a piston in the cylinder having a piston rod extending through one end of the cylinder, a spring in the cylinder between the cylinder and the piston urging the piston toward said one end of the cylinder, sealing means to seal the piston in the cylinder when the piston moves toward said one end of the cylinder but to pass fluid freely when the piston moves in the opposite direction, a restricted orifice through the piston, a second piston in the cylinder having a piston rod extending through the other end of the cylinder, a spring in the cylinder between the cylinder and the piston urging the piston toward said other end of the cyinder, means to seal the second piston in the cylinder when it moves away from said other end of the cylinder but to pass fluid freely when it moves in the opposite direction, a bypass around the second piston, a shut-off valve in the bypass, a restricted orifice in the bypass, pulleys carried by the cylinder intermediate its ends, and a tension element connected to one of the piston rods and passing over the end of the other piston rod and over the pulleys for connection to a load.

3. A shock absorber for cranes and the like comprising a cylinder, first and second pistons in the cylinder having piston rods extending through the opposite ends of the cylinder, means to apply a load to the piston rods to urge each of the pistons to move in one direction in the cylinder, a pair of springs in the cylinder, engaging the pistons respectively and urging each of the pistons in the opposite direction, sealing means for the first piston sealing it in the cylinder when it tends to move in said opposite direction but allowing flow of fluid therepast when it moves in said one direction, means forming a restricted bypass around the first piston to provide restricted movement thereof in said other direction thereby to damp recoil of the spring, sealing means for the second piston to seal it in the cylinder when it tends to move in said one direction, a restricted bypass around the second piston, and a shut-off valve in the bypass to allow restricted movement of the second piston in response to the load when the shut-off valve is open and to hold the second piston against movement by trapped fluid when the shut-off valve is closed.

References Cited in the file of this patent
UNITED STATES PATENTS

| | | |
|---|---|---|
| 2,033,035 | Koons | Mar. 3, 1936 |
| 2,124,692 | Fermier et al. | July 26, 1938 |
| 2,176,979 | Platz | Oct. 24, 1939 |
| 2,450,154 | Osterhoudt | Sept. 28, 1948 |

FOREIGN PATENTS

| | | |
|---|---|---|
| 692,940 | Germany | June 29, 1940 |